T. H. ARNOLD.
Horse Hay Fork.
No. 59,539.
Patented Nov. 13, 1866.
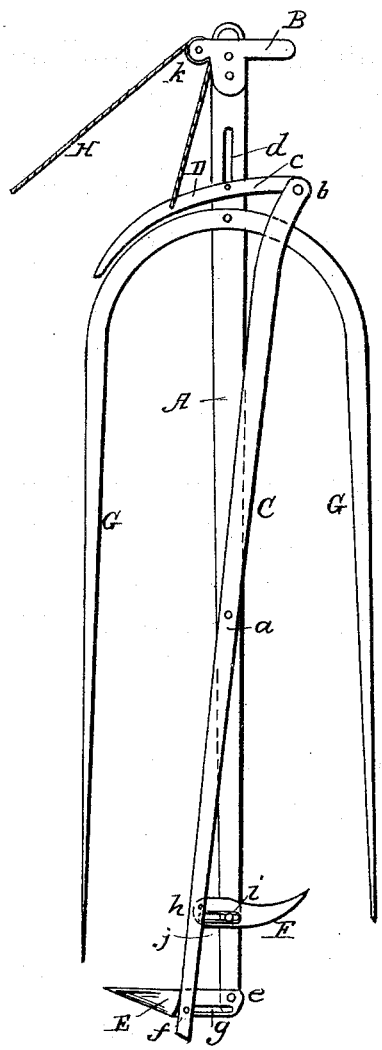
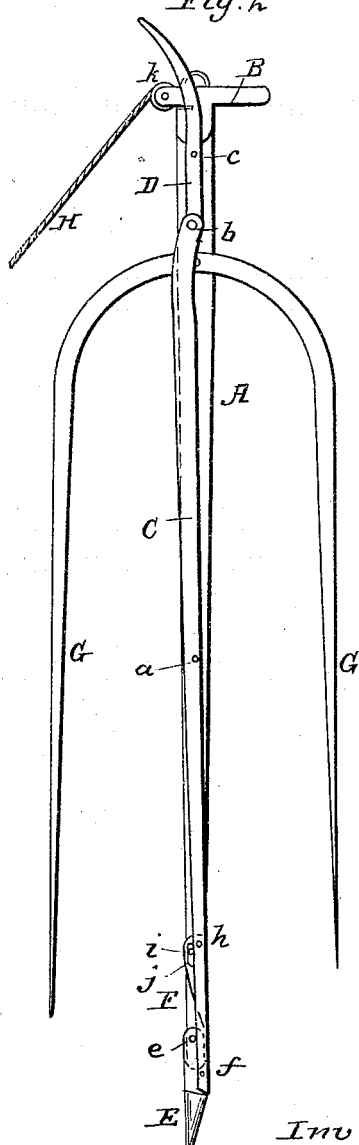

UNITED STATES PATENT OFFICE.

T. H. ARNOLD, OF TROY, PENNSYLVANIA.

IMPROVEMENT IN HORSE HAY-FORKS.

Specification forming part of Letters Patent No. 59,539, dated November 13, 1866.

*To all whom it may concern:*

Be it known that I, T. H. ARNOLD, of Troy, in the county of Bradford and State of Pennsylvania, have invented a new and Improved Horse Hay-Fork; and I do hereby declare that the following is a full, clear, and exact description thereof, which will enable others skilled in the art to make and use the same, reference being had to the accompanying drawings, forming part of this specification, in which—

Figure 1 is a side view of my invention, with the parts shown in the position they occupy in raising the hay. Fig. 2 is also a side view of the same, with the parts shown in the position they occupy after the hay is discharged from the device.

Similar letters of reference indicate like parts.

This invention relates to an improvement in that class of horse hay-forks which are provided with hooks or prongs connected with certain mechanism which admits of their being adjusted in line with a bar, so that they may be readily thrust into the load or mass of hay to be elevated, and then turned outward from the bar, so as to catch into the hay and take up a quantity when the device is elevated.

The invention more especially relates to an improvement on a horse hay-fork for which Letters Patent were granted to me bearing date May 29, 1866. This fork, in common with others of the same class, operates well, and may be manipulated with great facility; but they are all liable to the objection of letting a great deal of hay fall from them while being hoisted—that is, if the hay be short; and the object of this invention is to obviate that difficulty.

The invention consists in having two or more arms attached to the bar of the device, near its upper end, and extending downward nearly to its lower end, as hereinafter fully shown and described, whereby the desired end is attained.

A represents a straight bar, having a crosspiece or handle, B, secured to its upper end; and C is also a straight bar, which is pivoted to bar A, as shown at *a*, the latter passing through C about at its center. The upper end of the bar C has an arm, D, connected to it by a pivot, *b*, and this arm is connected to the bar A by a pin, *c*, which is fitted in a vertical slot, *d*, in A; and it will be seen by referring to the drawings that when the free or disengaged end of the arm D is raised, the bar C will be brought in line with bar A, and when said arm is lowered the bar C will be thrown into an oblique position relatively with bar A. To the lower end of the bar A a hook or prong, E, is pivoted, as shown at *e*, and this hook or prong is connected to the lower end of the bar C by a pin, *f*, which works in an oblong slot, *g*, in the hook or prong E.

F is a hook or prong, pivoted to the bar C, as shown at *h*, and is connected to the bar A by a pin, *i*, working in a slot, *j*, in said hook F.

When the bars A and C are in line with each other, by raising the arm D the hooks or prongs E F will be in a vertical position, and in line with the bars A C, as shown in Fig. 2, and when in this position they may be readily thrust into the hay to the desired depth.

G G are two arms, which are attached to the upper part of the bar A, and extend down at opposite sides of said bar, nearly to its lower end, as shown in Fig. 1. These arms may be constructed of a single bar of metal, bent in semicircular form at its center, the curve being of such a length as to admit of the arms being a requisite distance from bar A.

H is a cord attached to the arm D, and passing around a pulley, *k*, in one end of the handle B.

In using the fork, the person takes hold of the handle B, and then, by raising the arm D, brings the hooks or prongs into the position shown in Fig. 2. The fork is then thrust into the hay a requisite distance, and the arm D is pressed down, and the hooks or prongs E F thereby forced outward to the position shown in Fig. 1. The device is then hoisted by the usual tackle, with horse attached, the hooks sustaining or holding a certain quantity of hay, and the arms G G preventing the hay from dropping off from the hooks, the hay, it being understood, being wedged in between the arms G G. This simple attachment of the arms G G to the bar A admits of short hay being elevated by the fork without having a portion of hay drop off during each ascent of the same. When the fork, with the hay it holds, has been elevated over the desired spot, the operator pulls the cord H, and thereby raises the arm D, which causes the hooks or prongs E F to be thrown down, and the hay is discharged.

The construction of the fork and the operation of the same, so far as the loading and discharging of the hay are concerned, are substantially the same as that shown and described in my Letters Patent previously alluded to, and therefore a more minute description is not here necessary.

Having thus described my invention, I claim as new and desire to secure by Letters Patent—

The slotted prongs E F, in combination with the bar C, arm D, slotted bar A, and arms G, arranged and operating in the manner and for the purpose specified.

T. H. ARNOLD.

Witnesses:
WM. F. MCNAMARA,
ALEX. F. ROBERTS.